United States Patent
Dassel (10) Patent No.: US 9,493,360 B2
(45) Date of Patent: Nov. 15, 2016

(54) PROCESSES AND SYSTEMS FOR NON-EQUILIBRIUM TRICHLOROSILANE PRODUCTION

(71) Applicant: CENTROTHERM PHOTOVOLTAICS USA, INC., Poulsbo, WA (US)

(72) Inventor: Mark William Dassel, Poulsbo, WA (US)

(73) Assignee: SiTec GmbH, Augsburg (DE)

( * ) Notice: Subject to any disclaimer, the term of this patent is extended or adjusted under 35 U.S.C. 154(b) by 134 days.

(21) Appl. No.: 14/356,877

(22) PCT Filed: Nov. 10, 2012

(86) PCT No.: PCT/US2012/064568
§ 371 (c)(1),
(2) Date: May 7, 2014

(87) PCT Pub. No.: WO2013/074425
PCT Pub. Date: May 23, 2013

(65) Prior Publication Data
US 2014/0322121 A1 Oct. 30, 2014

Related U.S. Application Data

(60) Provisional application No. 61/559,657, filed on Nov. 14, 2011.

(51) Int. Cl.
*B01J 23/26* (2006.01)
*B01J 35/02* (2006.01)
(Continued)

(52) U.S. Cl.
CPC ............ *C01B 33/1071* (2013.01); *B01J 23/26* (2013.01); *B01J 23/745* (2013.01); *B01J 23/755* (2013.01); *B01J 35/026* (2013.01)

(58) Field of Classification Search
CPC ...... B01J 23/26; B01J 23/745; B01J 23/755; B01J 35/026
See application file for complete search history.

(56) References Cited

U.S. PATENT DOCUMENTS 4,526,769 A * 7/1985 Ingle ................. C01B 33/035
423/342
5,401,872 A 3/1995 Burgie et al.
(Continued)

FOREIGN PATENT DOCUMENTS

| EP | 0133209 | 2/1985 |
| EP | 1317400 | 11/2003 |

(Continued)

OTHER PUBLICATIONS

Kipo, International Search Report,PCT/US2012/064568, Mailed Mar. 26, 2013, 4 pages, South Korea.
(Continued)

*Primary Examiner* — Colleen Dunn
(74) *Attorney, Agent, or Firm* — BioMed IP (57) ABSTRACT

A catalytic process for converting silicon tetrachloride (STC) into trichlorosilane (TCS) utilizes a metal catalyst such as metal silicide at a low temperature such as 500 C, where the STC is reacted with hydrogen gas in the presence of catalyst and under non-thermal equilibrium conditions, to provide for a product gas stream that includes TCS at levels exceeding those obtained at thermal equilibrium, as well as optionally including HCl and unreacted STC.

16 Claims, 4 Drawing Sheets

(51) Int. Cl.
*C01B 33/107* (2006.01)
*B01J 23/755* (2006.01)
*B01J 23/745* (2006.01)

(56) References Cited

U.S. PATENT DOCUMENTS

| | | | |
|---|---|---|---|
| 5,716,590 A * | 2/1998 | Roewer | A62D 3/37 |
| | | | 423/342 |
| 6,375,911 B1 | 4/2002 | Ohmi et al. | |
| 8,206,676 B2 | 6/2012 | Agarwal et al. | |
| 2004/0101463 A1 * | 5/2004 | Bulan | C01B 33/03 |
| | | | 423/342 |
| 2009/0035205 A1 * | 2/2009 | Bohmhammel | C01B 33/1071 |
| | | | 423/342 |
| 2011/0110839 A1 * | 5/2011 | Fahrenbruck | C01B 33/1071 |
| | | | 423/342 |

FOREIGN PATENT DOCUMENTS

| | | |
|---|---|---|
| EP | 2321041 | 5/2011 |
| WO | 2013138461 | 9/2013 |

OTHER PUBLICATIONS

Extended European Search Report, Application No. 12849133.9, Mailed Nov. 26, 2015.

Ingle, W.M. et al., "Kinetics of the Hydrogenation of Silicon Tetrachloride", Journal of the Electrochemical Society, Electrochemical Society, v. 132, No. 5, May 1, 1985, pp. 1236-1240.

Walter, H. et al., "Mechanism of the Silicide-Catalysed Hydrodehalogenation of Silicon Tetrachloride to Trichlorosilane", Journal of the Chemical Society Faraday Transactions, Royal Society of Chemistry, Cambridge, GB, v. 92, No. 22, Nov. 21, 1996, pp. 4605-4608.

* cited by examiner

PROCESSES AND SYSTEMS FOR NON-EQUILIBRIUM TRICHLOROSILANE PRODUCTION

CROSS-REFERENCE(S) TO RELATED APPLICATION(S)

This application claims the benefit under 35 U.S.C. §119(e) of U.S. Provisional Patent Application No. 61/559,657 filed Nov. 14, 2011; where this provisional application is incorporated herein by reference in its entirety.

FIELD OF THE INVENTION

The present invention relates generally to chemical processes, and more specifically to chemical processes that produce trichlorosilane from silicon tetrachloride.

BACKGROUND

The standard of living of modern society relies heavily on economical access to semiconductors and integrated circuits. In turn, the manufacture of semiconductors requires access to high purity silicon, and thus improved processes and systems for the manufacture of high purity silicon is of tremendous value.

Semiconductor grade polysilicon must be extremely pure or semiconductors and photovoltaic cells made therefrom do not provide optimal operability. The Siemens process is utilized in many commercial plants for the preparation of ultrapure polysilicon. In the Siemens process, high purity silicon rods are exposed to trichlorosilane ($HSiCl_3$, TCS) at about 1150° C. The TCS gas decomposes and deposits additional silicon onto the rods. This process produces extremely pure silicon, also called polysilicon or polycrystalline silicon, having impurity levels of less than one part per billion when the process is performed under optimal conditions. The Siemens process can be described by the chemical reaction:

$$4HSiCl_3 => Si + 3SiCl_4 + 2H_2$$

As shown by the above equation, silicon tetrachloride ($SiCl_4$, STC) is a byproduct of the Siemens process. In fact, STC is a byproduct that is generated in significant amounts, and it is essentially a waste material. The successful and economical conversion of STC into a useful material is essential in order for the Siemens process to operate in an economic and environmentally friendly manner. One option is to convert STC back into TCS, where TCS can enter into the Siemens process. In fact, various processes to achieve that goal have been described. The present invention provides an improved process for achieving that result.

SUMMARY

The present disclosure provides systems and processes to convert STC to TCS. More specifically, the systems and processes are configured to operate with a catalyst, thereby allowing the process to occur at relatively low reaction temperatures, and furthermore are configured to operate in a non-equilibrium mode so that the conversion of STC to TCS does not achieve thermal equilibrium within the system. By not allowing the reaction to proceed to thermal equilibrium, the level of conversion of STC to TCS may be increased relative to that obtained in conventional converters that operate under thermal equilibrium conditions, and thus the methods and processes of the present disclosure are said to provide for supra-equilibrium levels of STC formation, as discussed and defined more fully herein.

In one embodiment, the present disclosure provides a process for converting STC to TCS and typically other products as well, comprising contacting a feed gas comprising STC and $H_2$ with a catalyst in a converter under non-equilibrium conditions so that a supra-equilibrium level of STC conversion is achieved. In various optional embodiments, the process may be characterized by one or more of the following criteria: the catalyst is a metal catalyst, for example, the metal catalyst may be in the form of shaped metal pieces with high aggregate surface area, or a fine wire mesh, the metal catalyst comprises metal silicides, including without limitation chrome silicide, nickel silicide, and iron silicide; the metal catalyst is formed within the converter (in-situ); the metal catalyst is formed outside the converter (ex situ) and then placed into the converter; the converter is charged with a self-supporting metal support, and the surface of the support is at least partially converted to metal catalyst within the converter; the converter is charged with a metal support, and the entirety of the metal support is converted to metal catalyst, the metal catalyst having sufficient mechanical integrity to maintain its morphology during operation of the converter. Regarding the temperature of the converter, the reaction proceeds at a low temperature within the converter, where the low temperature may optionally be specified to be less than 700° C., or is within the range of from 100° C. to 700° C., or is within the range of from 300° C. to 600° C., or is about 500° C. Regarding the holdup time, the hold-up time of the feed gas in the converter may optionally be specified to range from 0.1 second to 20 seconds, or from 1 seconds to 20 seconds, or from 0.1 seconds to 30 seconds, or from 1 second to 30 seconds, or it ranges from 1 seconds to 5 seconds, or from 1 second to 10 seconds, or it ranges from 2 seconds to 5 seconds, or it is about 3 seconds. Regarding the pressure within the converter, the pressure may optionally be specified to range from 0.5 atmospheres absolute to 20 atmospheres absolute, or the pressure in the converter ranges from 1.0 atmospheres absolute to 12 atmospheres absolute, or the pressure in the converter ranges from 2.0 atmospheres absolute to 10 atmospheres absolute, or the pressure in the converter is about 6 atmospheres absolute. In any of the embodiments disclosed herein, the feed gas may optionally further comprise HCl.

Optionally, incoming STC is mixed with $H_2$ and heated to within a few degrees centigrade of the exit temperature of the catalytic converter in a heat interchanger; these preheated gases are then heated to a few degrees above the exit temperature of the catalytic converter in a supplemental heater; the supplemental heater may be heated by means comprising direct fired gases, and electrical heaters; the hot gases are next fed to the catalytic converter where the reaction to gaseous products comprising TCS and HCl occurs; the hot gases exiting the catalytic converter are used to preheat incoming STC and $H_2$ vapor in the heat interchanger; cooled product gases exiting the heat interchanger are then separated into constituent parts (e.g., TCS, HCl, and STC) for reuse in a polysilicon plant; and STC separated from the catalytic converter off-gas is recycled back to the catalytic converter system until completely converted to TCS.

In another embodiment, the present disclosure provides a process, the process comprising providing a converter (reactor) with catalyst contained therein, performing a chemical reaction within the converter, the chemical reaction being a reaction of feedstock components comprising STC and $H_2$ to form product components comprising TCS and HCl, the feedstock components entering the converter and the product components simultaneously exiting the reactor, the process characterized in that the process is performed under operating conditions of temperature and holdup time that do not provide for equilibrium conversion of feedstock components to product components, and preferably provide for supra-equilibrium conversion of feedstock components to product components.

In another embodiment, the present disclosure provides a system, the system comprising a converter having catalyst therein, a feedstock inlet, a product outlet, a monitoring means to measure the concentration of STC in the feedstock, a monitoring means to measure the concentration of TCS in the product, a heating mechanism to maintain the converter within a desired temperature range, and a flow rate mechanism to maintain a desired holdup time of the feedstock within the reactor. The system may further comprise a feedback loop, whereby the measurements of STC and TCS are used to calculate an actual conversion of STC to TCS, and this conversion is compared to an equilibrium conversion for the operating temperature of the converter, and when the actual conversion is not within a pre-determined range or above a pre-determined value in excess of the equilibrium conversion, then the system makes automatic adjustments to the operating conditions of the converter to achieve a conversion of STC to TCS that meets the pre-determined value in excess of the equilibrium conversion. In optional embodiments, the automatic adjustments are made to the holdup time within the reactor, and/or the temperature of the reactor, and/or the pressure within the reactor.

In another embodiment, STC conversion is maintained at supra-equilibrium levels by adjusting one or more operation parameters, e.g., converter holdup time. Thus, the present disclosure provides a process for converting STC to TCS, the process including delivering a feedstock comprising STC and $H_2$ into a converter, the converter comprising a catalyst and being operated at a converter temperature within the range of 400 to 800° C., where operation parameters of the conversion are selected and adjusted as needed, the operation parameters including converter temperature, converter pressure, converter free volume, and converter holdup time, the operation parameters being selected in order to provide for a supra-equilibrium concentration of TCS in the product. Optionally, adjustments to one or more operation parameters may be made by an automated controller which receives information about the converter and the feedstock and product component concentrations and then decreases or increases a reaction parameter, e.g., the volumetric rate of feedstock entry into the converter, in order to provide for and maintain a supra-equilibrium concentration of TCS in the product gas.

According to current teaching, it is not possible to exceed equilibrium conversion of STC to TCS in an STC converter; i.e., the thermal equilibrium level of conversion is the highest conversion of STC to TCS that can be achieved. The present disclosure is contrary to this current teaching. Also according to current teaching, HCl in the converter feed suppresses the thermal equilibrium conversion of STC to TCS and is therefore counter-productive and to be avoided by carefully removing HCl from the converter feed. The present disclosure is also contrary to this current teaching. The present disclosure provides processes and systems that recognize and embody these contrary teachings, either one or both of them being included in the methods and systems of the present disclosure.

The details of one or more embodiments are set forth in the description below. The features illustrated or described in connection with one exemplary embodiment may be combined with the features of other embodiments. Other features, objects and advantages will be apparent from the description, the drawings, and the claims. In addition, the disclosures of all patents and patent applications referenced herein are incorporated by reference in their entirety.

BRIEF DESCRIPTION OF THE DRAWINGS

FIG. 1 provides a flowchart of a preferred embodiment of the process of the invention, which includes a heat interchanger; FIG. 1 illustrates the operation of a low temperature catalytic converter for conversion of STC to TCS.

DETAILED DESCRIPTION OF THE INVENTION

The present invention provides improved processes and systems for converting STC to TCS. In certain embodiments, the process is operated under non-equilibrium conditions, in the presence of a catalyst for the reaction, and with various feedstocks. As an aid to understanding the present invention, certain general principles, as well as definitions and conventions as used herein, are provided as follows.

DEFINITIONS, CONVENTIONS AND GENERAL PRINCIPLES

Catalyst refers to a material that lowers the activation energy of the forward and reverse reactions whereby STC is converted to TCS. As discussed below, a preferred catalyst is metal silicide.

Converter, also referred to as reactor, refers to the device that forms the reaction chamber wherein the chemical reactions of the present disclosure are achieved. When a catalyst is present in the converter, the converter may be referred to as a catalytic converter.

Feedstock (or feed) refers to the materials (or components or species), typically although not necessarily existing in a gaseous state, that are directed into the converter. The feedstock may be a single gas stream composed of two or more different atomic or, more commonly, molecular species, such as a mixture of hydrogen and STC in gas form. Alternatively, the feedstock may be two or more gas streams, any one of which may contain one, or more than one, atomic or, more commonly, molecular species. For instance, the feedstock may be two gas streams: a gas stream comprising only or primarily hydrogen, and a gas stream comprising only or primarily STC. As discussed later herein, the feedstock may include other components besides hydrogen and STC, e.g., it may include hydrochloric acid.

STC is an abbreviation for tetrachlorosilane ($SiCl_4$); TCS is an abbreviation for trichlorosilane ($HSiCl_3$); DCS is an abbreviation for dichlorosilane ($H_2SiCl_2$). The terms hydrogen and $H_2$ may be used interchangeably. Also, the terms hydrochloric acid and HCl may be used interchangeably.

For any given converter temperature and feedstock composition, one versed in the thermodynamic arts may calculate an equilibrium conversion level of STC to TCS using well-known thermodynamic methods, for example, the Gibbs's Free Energy Minimization model may be used for calculating a thermodynamic equilibrium. "STC conversion level" refers to the amount of STC that enters the converter and which is converted to TCS, in other words, the number of moles of TCS exiting the converter in a given period of time, divided by the number of moles of STC entering the converter during the same period of time. STC conversion may be expressed in percentage form when STC conversion is multiplied by 100. This level of conversion is referred to herein as thermal equilibrium at a given temperature, or more simply thermal equilibrium. When STC is converted to TCS to provide a STC conversion that is not the thermal equilibrium STC conversion, then the process is said to provide a non-equilibrium conversion of STC. The processes and systems of the present disclosure provide for non-equilibrium conversion of STC to form TCS. More specifically, the processes and systems of the present disclosure may be configured to provide a greater amount of STC conversion to TCS than is obtained under thermal equilibrium conditions, for a specified converter operation temperature and for a specified compositions of feedstock, and as such the processes and systems of the present disclosure are said to provide supra-equilibrium conversion of STC to TCS, or more simply, supra-equilibrium conversion.

For purposes of clarity, the present disclosure differentiates three different converter types: 1) a thermal converter refers to a converter that does not contain catalyst, which is operated at a high temperature, such as in excess of 1,000° C., and wherein the conversion of STC to TCS is at or substantially approaches thermal equilibrium; 2) a catalyzed equilibrium converter contains catalyst, is operated at a low temperature relative to the thermal converter, and is operated under conditions, e.g., at an appropriate holdup time, sufficient to allow the conversion of STC to TCS to achieve or substantially approach thermal equilibrium; and 3) a catalyzed non-equilibrium converter, which contains catalyst and is operated at both a low temperature relative to the aforementioned thermal converter and under conditions, e.g., at an appropriate holdup time, that achieves STC conversion levels greater than those obtained at thermal equilibrium.

Reaction Process

The Chemical Reaction

The present disclosure provides an improved process for converting a feedstock (also referred to herein as a feed gas) comprising STC to form TCS and other products. In one aspect, the disclosed process includes contacting feedstock reactants with catalyst. The process of the present disclosure includes providing a feedstock in gaseous form, and then directing that feedstock into a catalytic converter. The process also includes collecting a product, typically in gaseous form, from the catalytic converter. The gas present within the catalytic converter will be referred to herein simply as "gas" or "the gas", without regard to composition, for example, without regard to whether the composition of the gas is entirely or largely the same composition as the feedstock, or entirely or largely the same composition as the product, or a mixture thereof, or includes intermediate species that are not present in either the feedstock or product.

The feedstock will contain, at a minimum, STC and $H_2$. In various embodiments, the feedstock may also contain any one or more of TCS, DCS and HCl. In one embodiment, the feedstock contains at least STC, $H_2$ and TCS, and optionally only these three components. In one embodiment, the feedstock contains at least STC, $H_2$, TCS and DCS, and optionally only these four components. In further embodiments, any of these feedstocks may additionally contain HCl. In one embodiment, the feed gas contains HCl, and the HCl is present at a concentration that facilitates the formation of TCS.

In one embodiment, all of the components of the feedstock are present in a single gas stream. In this embodiment, the feed gases are directed into the catalytic converter, whereupon the gases contact the catalyst in the catalytic converter. In an alternative embodiment, the components of the feedstock exist in two gas streams. For example, STC may be present in a first gas stream and $H_2$ is present in a second gas stream. The feedstock will typically be prepared by mixing together STC and $H_2$. For example, incoming STC may be diluted with $H_2$ to form the feedstock.

The STC content of the feedstock may range from 90 mol % to a low of 10 mol %, based on the total number of moles of components in the feedstock. The hydrogen content of the feedstock may range from 10 mol % to 90 mol %, based on the total number of moles of components in the feedstock. In one embodiment, the feedstock contains a majority of $H_2$. In one embodiment, the feedstock contains 65-95 mol % or 70-90 mol % $H_2$ and 5-35 mol % or 10-30 mol % STC, respectively, based solely on the amount of $H_2$ and STC in the feedstock. In one embodiment the feed gas contains 80 mol % $H_2$ and 20 mol % STC. In various embodiments, it may be stated that the molar ratio of hydrogen to STC in the feedstock is selected from $\geq 1$, $\geq 2$, $\geq 3$, or $\geq 4$. In other embodiments, it may be stated that the molar ratio of $H_2$:STC in the feedstock is 1:1 or is 2:1 or is 3:1 or is 4:1 or is 5:1 or is within the range of 1:1 to 5:1, or is within the range of 1:1 to 4:1, or is within the range of 1:1 to 3:1, where each of the values in these ratios may have a deviation in a range of ±15% or ±10% or ±5%, for example, the ratio of 1:1 may be a ratio of 1:0.9-1.1 to 0.9-1.1:1 when the deviation is 10%.

Because the process of the present disclosure may, under certain operating conditions, make significant amounts of DCS along with TCS, and because excessive amounts of DCS when fed into a chemical vapor deposition (CVD) or thermal converter may form excessive amounts of unwanted amorphous dust in the converter, a preferred optional embodiment of the present disclosure includes the separation of DCS from TCS as obtained from the converter. Optionally, the separated DCS may be converted to TCS in a commutation reaction, i.e., a reaction whereby DCS and STC react together to form TCS, optionally using a stoichiometric excess of STC.

Non-Equilibrium Conversion

Conventional thermal converters, even catalyzed converters, are operated in such a manner that they achieve thermal equilibrium for the conversion of STC to TCS. The amount of TCS produced at thermal equilibrium can be calculated by well known models. The Gibb's Free Energy Minimization model is one such model, and by way of illustration, thermal conversion of STC in hydrogen to TCS is calculated as a function of temperature as is shown in the following table, where "Percent STC conversion to TCS" refers to the percentage of STC that enters the converter and which is converted to TCS, in other words, the number of moles of TCS exiting the converter in a given period of time, divided by the number of moles of STC entering the converter during the same period of time, multiplied by 100.

TABLE

| Reaction Temperature (° C.) | Percent STC conversion to TCS | | |
|---|---|---|---|
| | For 2:1 ($H_2$:STC) | For 3:1 ($H_2$:STC) | For 4:1 ($H_2$:STC) |
| 200 | 0.11 | 0.13 | 0.15 |
| 300 | 0.53 | 0.65 | 0.75 |
| 400 | 1.6 | 1.9 | 2.2 |
| 500 | 3.5 | 4.3 | 4.9 |
| 600 | 6.3 | 7.7 | 8.8 |
| 700 | 9.8 | 11.9 | 13.7 |
| 800 | 13.8 | 16.7 | 19.1 |
| 900 | 18.0 | 21.8 | 24.8 |
| 1000 | 22.2 | 26.8 | 30.4 |
| 1100 | 26.3 | 31.5 | 35.6 |
| 1200 | 30.0 | 35.9 | 40.4 |

Figure 2:
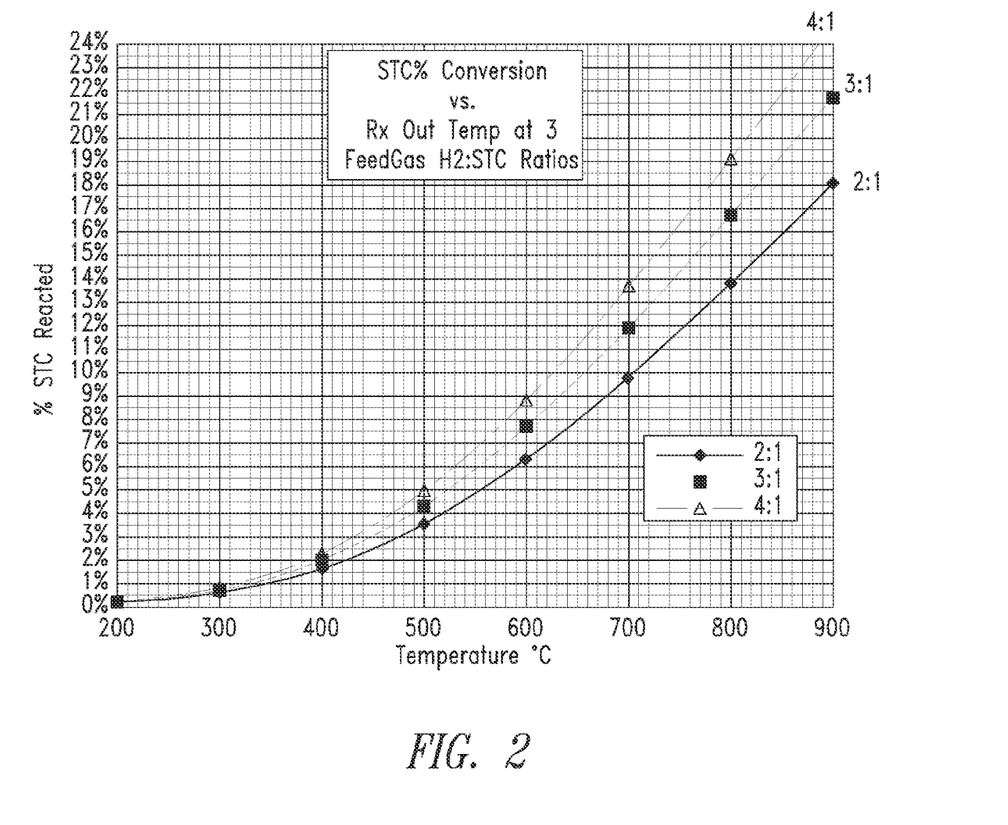
FIG. 2 is a chart of percent equilibrium conversion of STC to TCS (y-axis) as a function of temperature (x-axis) calculated using the Gibb's Free Energy Minimization model for calculating thermodynamic equilibrium, at three different $H_2$:STC feedstock ratios (2:1, 3:1 and 4:1).

The percent STC conversion to TCS at thermal equilibrium is seen from the Table, and the corresponding FIG. 2 which provides a plot of the tabulated calculated values, to be a function of the reaction temperature, where higher reaction temperature favors the formation of TCS. These calculated values compare favorably to the conversions actually observed under currently practiced operating conditions for converters, where those converters operate to achieve thermal equilibrium. Not obvious from these values is that the time to reach thermal equilibrium is relatively long, in fact commercially unacceptably long, when the reaction temperature of the converter is less than about 1,000° C., and certainly when it is less than 800° C. A catalyzed process allows a converter to convert STC to TCS in a reasonable length of time at temperatures below 1,000° C., or below 800° C. However, the yield of TCS under these low (under about 1,000° C.) temperature conditions is not very good, only up to about 14% when the feedstock has a $H_2$:STC ratio of 2:1. While it is possible to increase that conversion by including more hydrogen in the feedstock, such an approach is ultimately counterproductive because although the conversion becomes higher, the feedstock has much less STC to start with, so the overall amount of TCS produced is reduced. All things considered, the current industry practice is to operate at high temperature (ca. 1150° C.) and low $H_2$:STC ratio (ca. 2:1) in order to achieve a maximal amount of TCS via the conversion process. In various embodiments, the process of the present disclosure will provide at least 5% more STC conversion than a corresponding process run to thermal equilibrium. For example, when a catalytic reactor is operated at 500° C. with a 2:1 $H_2$:STC feedstock to achieve thermal equilibrium, that process will achieve a 3.5% conversion of STC to TCS per pass through the converter. The corresponding non-equilibrium process of the present disclosure provides, in various embodiments, at least a 5% increase in STC conversion, i.e., a 3.7% conversion, or at least a 10% increase in STC conversion, i.e., a 3.9% conversion, or at least a 15% increase in STC conversion, i.e., a 4.0% conversion, or at least a 20% increase in STC conversion, i.e., a 4.2% conversion, or at least a 25% increase in STC conversion, i.e., a 4.4% conversion, etc. as described elsewhere herein.

This high temperature in excess of 1100° C. is undesirable from both a capital cost and operational cost point of view, for reasons provided elsewhere herein but discussed here as well. Energy costs money, and it requires more energy to maintain a converter at a higher temperature than at a lower temperature. Particularly when the temperature is very high, in excess of 1,000° C., the heat introduced into a converter will quickly escape into the ambient environment. To mitigate this temperature loss, thermal converters are well insulted, typically with blocks of graphite insulation placed around the inside of the converter's shell. However, in typical practice those insulation blocks quickly degrade and must be replaced every 3-6 months. Maintaining a high temperature is also challenging from an operational point of view. The graphite heating elements, for example, add carbon in the form of methyl chlorosilanes to the TCS product, where those methyl chlorosilanes are very difficult to separate from the TCS. Overall, there is a great need in the industry to find a lower temperature process (e.g., a process than operates under 1,000° C., and preferably operates at under 800° C.) for STC conversion to TCS that proceeds with commercially acceptable conversions at commercially acceptable rates.

The present disclosure provides such a process, by combining catalytic conversion with non-equilibrium operating conditions. In this way, for a temperature of, for example, 600° C. and a $H_2$:STC ratio of 2:1, the process of the present disclosure can achieve greater than 6.3% conversion of STC to TCS. In various embodiments, the processes and systems of the present disclosure may exceed the calculated thermal equilibrium STC conversion values by a factor of 1.05 (i.e., 5% greater conversion of STC to TCS), or a factor of 1.1, or a factor of 1.15, or a factor of 1.2, or a factor of 1.25, or a factor of 1.5, or a factor of 1.75, or a factor of 2.0 (i.e., 100% greater conversion of STC to TCS), or a factor of 2.5, or a factor of 3.0, or a factor of 3.25, or a factor of 3.5, or a factor of 3.75, or a factor of 4.0, or a factor of 4.25, or a factor of 4.5, or a factor of 4.75, or a factor of 5.0, or a factor of 5.25, or a factor of 5.5, or a factor of 5.75, or a factor of 6.0 or more.

In one aspect, the present disclosure provides a process for converting silicon tetrachloride (STC) to trichlorosilane (TCS), where the process comprises contacting a feed gas comprising STC and $H_2$ with a catalyst in a converter under non-equilibrium operating conditions to provide a supra-equilibrium level of STC conversion to TCS. In one embodiment, the achievement of non-equilibrium operating conditions to provide a supra-equilibrium level of STC conversion to TCS is realized when the % conversion of STC in the feed gas to TCS in the product gas exceeds the corresponding % conversion that is observed, or alternatively calculated (see, e.g., the preceding Table), when the conversion reaction is run under conditions that achieve thermal equilibrium.

Operation Parameter: HCl in Feedstock

In one embodiment, the feedstock includes HCl along with STC and $H_2$, and optionally other components. The inclusion of HCl in the feedstock is an aspect of the present disclosure that is contrary to current teaching/practice. Current teaching is that: (a) the reaction producing TCS from STC is: STC+$H_2 \leftrightarrow$ TCS+HCl, and (b) the equilibrium amount of TCS produced by this reaction is lowered if HCl is present in the feed to the converter. However, according to the present disclosure, by adding HCl to the feedstock, STC conversion may be increased compared to that obtained when the converter is operated under equilibrium conditions at temperatures 800° C. without the presence of HCl in the feedstock, by an order of at least 1.5×, or at least 2×, or at least 3×. While not intending to be bound thereby, a theory to explain this counter-intuitive result is provided elsewhere herein.

In order to achieve supra-equilibrium levels of STC conversion, the HCl content in the feedstock may be fixed and other operating parameters varied, or other operating parameters may be fixed and the level of HCl in the feedstock may be varied. For example, for a selected HCl content in the feedstock and at a selected converter operating temperature, the volumetric feed rate to the converter may be increased or decreased to control STC conversion at desired supra-equilibrium conversion levels. If conversion is less than thermal equilibrium, at the given operating temperature, the volumetric feed rate may be reduced to increase holdup time and thereby to increase conversion. If conversion is greater than thermal equilibrium but below the maximum supra-equilibrium conversion level, the volumetric flow rate may be reduced or increased to achieve the desired level, as appropriate. Alternatively, for a specified holdup time, HCl content in the feedstock may be increased or decreased to achieve the desired supra-equilibrium conversion.

In various embodiments, the level of HCl in the feedstock delivered into the converter is maintained at ≥0.01 mole %, ≥0.05 mole %, ≥0.1 mole %, at ≥0.5 mol %, at ≥2 mol %, or at ≥3 mol %, or at ≥5 mol % HCl based on the total number of moles of components in the feedstock. For each of those various embodiments, it may optionally be specified that the level of HCl in the feedstock is ≤20 mol %, or ≤15 mol %, or ≤10 mol %, or ≤6 mol % based on the total number of moles of components in the feedstock.

Operation Parameter—Converter Temperature

The process of the present invention is run at a low temperature. As used herein, the process temperature refers to the temperature(s) present within the converter wherein STC is exposed to catalyst. In various embodiments, it may be stated that the converter temperature is within the range 300-1100° C.; or is within the range 400-900° C.; or is within the range 500-700° C.; or is within the range 500-600° C. In various embodiments, the process temperature ranges from about 100° C. to 700° C., or about 300° C. to 600° C., or about 450° C. to 550° C., or about 500° C. The temperature is preferably less than 700° C. or is preferably less than 800° C. In one embodiment, the process is operated at a temperature within the range of 400° C. to 800° C., or within the range of 400° C. to 600° C. The temperature within the reactor preferably does not fluctuate too much, for example, it preferably fluctuates by no more than 20%, or no more than 10%, or no more than 5%, or no more than 4%, or no more than 3%, or not more than 2%.

Operation Parameter—Converter Pressure

The gases present within the converter will, of course, exert a pressure on the walls of the converter. That pressure may be controlled, and in various embodiments of the invention, that pressure ranges from 0.5 atm. absolute to 20 atm. absolute, or from 1.0 atm. absolute to 12 atm. absolute, or is about 6 atm. absolute. In various embodiments, it may be stated that the converter pressure is within the range 20-400 PSIG; or within the range 40-300 PSIG; or within the range 60-200 PSIG; or within the range 80-100 PSIG.

The feedstock will be at a pressure somewhat above the converter pressure, in order that the feedstock will flow into the converter. The feedstock pressure may be on the order of 5% or 10% greater than the converter pressure.

Operation Parameter—Converter Holdup Time

Starting materials will enter the converter as a feed gas, and products will exit the converter as a product gas. The time between when a starting material enters the converter as a feed gas, and when that starting material exits the converter in the form of a product gas, is referred to herein as the hold-up time. The holdup time of the process may be controlled in order to control the length of time a reactant is present within the converter while it is being converted to a product.

More precisely, the holdup time is determined based on the free volume of the converter, and the flow rate of the gas through the converter. The converter free volume refers to the difference between the total volume within the converter (assuming nothing is in the converter) and the volume of the materials (primarily the catalyst and the support for the catalyst) that are placed into the converter and are present in the converter during converter operation. This difference is effectively the volume occupied by the product and feedstock gases within the converter. Converter free volume is measured in terms of volume units, for example, liters. Flow rate refers to the amount of gas that enters the converter in a selected period of time. The amount of gas may be characterized in various ways. For example, the volume of gas at a specified temperature may be used to characterize an amount of gas. As another example, the moles of gas that enter the converter is a way to characterize a gas amount. As used herein, flow rate is measured in terms of gas volume (at a specified temperature) entering the reactor per second. Holdup time is calculated by dividing converter free volume by flow rate, to provide holdup time in units of seconds.

Figure 3:
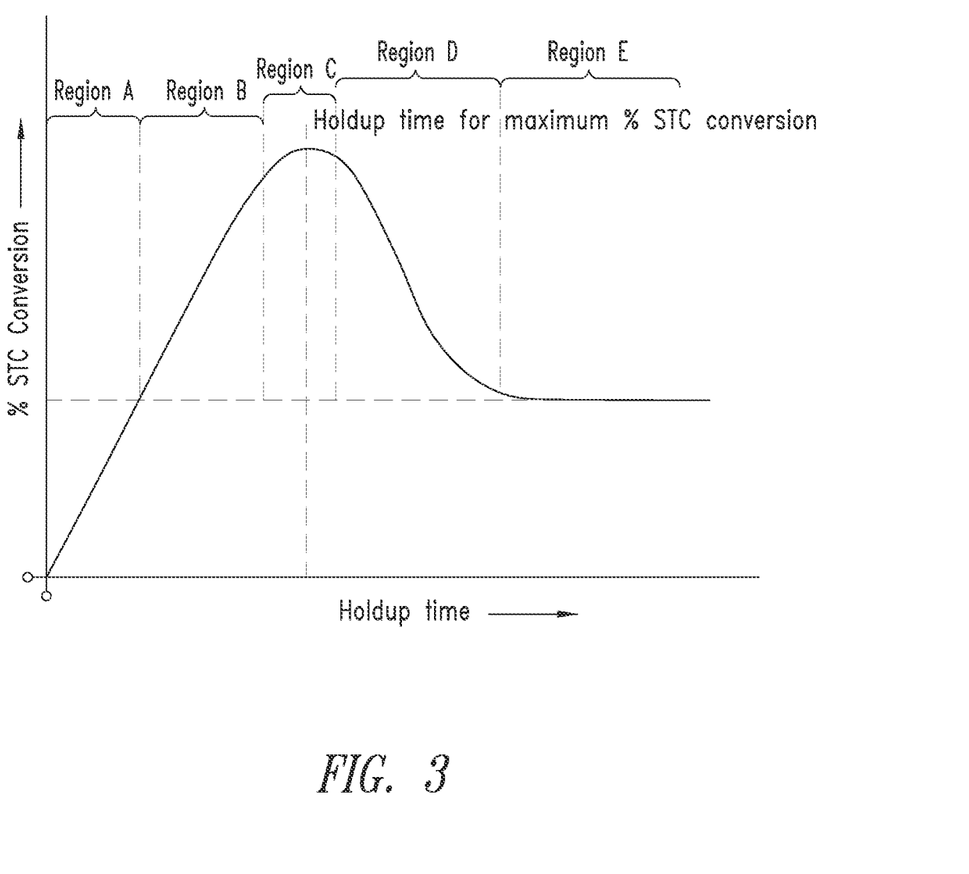
FIG. 3 is a graph that plots % STC conversion (on the y axis) vs. the holdup time within a reactor (on the x-axis).

In the process of the present disclosure, the holdup time should not be too long or too short. The impact of holdup time on the conversion of STC to TCS is shown graphically in FIG. 3 for a single converter temperature. If the converter temperature is increased or decreased, the graph will maintain the same general shape, however the details of slope and maximum conversion value etc. will change. In FIG. 3, the x axis provides the reactor holdup time, which can vary from a (theoretically) lower value of 0, which would be achieved if the feedstock instantaneously traveled through the reactor, to an upper value on the order of minutes, assuming the product gases are indefinitely stable under the operation conditions within the reactor. In the ordinary course, the holdup time ranges from about 0.1 seconds to about 30 seconds. FIG. 3 illustrates the fact that as hold up time is varied, the % STC conversion to TCS travels through five different regions. Region A is achieved with the shortest hold-up times. In Region A, the converter holdup time is so short that the reaction within the converter does not have sufficient time to reach thermal equilibrium. In this region A, the % of STC conversion is at a non-equilibrium level, and is relatively low because there is inadequate time for the conversion of STC to TCS to take place. On the opposite end of the spectrum is Region E, where the converter holdup time is sufficiently long that the conversion of STC to TCS achieves thermal equilibrium, and furthermore the holdup time is so long that variation of the holdup time by, e.g., 5% or 10% does not have any impact on the level of STC conversion. Current commercial converters operate in Region E. In the middle of FIG. 3 is Region C. Region C is the optimal holdup time, the so-called "sweet spot". In region C, the fast forward reaction of STC to form TCS has proceeded to a maximum extent relative to the slow back reaction of TCS converting back to STC. In other words, the relatively fast reaction of STC to form TCS has taken place, and the relatively slow reaction whereby TCS is converted back into STC has had a minimal impact on the relative amounts of STC and TCS within the reactor. In region B, the holdup time must be increased in order to obtain a concomitant increase in % STC conversion, while in region D the holdup time must be decreased in order to obtain an increase in % STC conversion. The processes of the present disclosure operate within regions A-D, which are the non-equilibrium regions, and preferably operate in regions B-D, which are the supra-equilibrium regions, and more preferably operate within region C, which is the maximum supra-equilibrium region. The region C may be variously defined as being ±5%, or ±10%, or ±15%, or ±20% or ±25% of the STC conversion attained at the maximum supra-equilibrium % STC conversion. When the converter is operated with operation parameters that provide for % STC conversion above thermal equilibrium, as achieved in regions B, C and D, then the converter is said to operate under supra-equilibrium conditions and provide supra-equilibrium levels of TCS.

In summary, if the holdup time is too long, then the conversion will proceed to thermal equilibrium, providing a lower than desired conversion of STC to TCS. If the holdup time is too short, then the feedstock is not exposed to the reaction conditions inside the converter for a long enough time for a desired amount of the STC in the feedstock to convert to TCS. In various embodiments of the process of the present disclosure, the holdup time ranges from 0.1 seconds to 30 seconds, or from 0.5 seconds to 20 seconds, or from 1 second to 10 seconds, or from 2 seconds to 5 seconds, or is about 3 seconds. By careful control of the hold-up time and in conjunction with other operation parameters, the conversion of STC to TCS is achieved according to the present invention under supra-equilibrium conditions, so that the conversion of STC to TCS is increased relative to that obtained when the conversion is under thermal equilibrium.

The exact value of holdup time needed to achieve % STC conversion in regions B, C or D, and preferably in region C, will depend on other operation parameters. For example, the concentration of the components of the feedstock, and the temperature and pressure inside the converter, and the catalyst loading in the converter, are operational parameters that will impact % STC conversion for a selected holdup time for a catalytic converter operating under non-equilibrium conditions.

In order to operate a catalytic converter according to the present process, a converter is loaded with catalyst and then the converter is brought to a temperature below 1,000° C., optionally within the range of 300-800° C. In one embodiment, the operation parameter that is most easily varied to achieve non-equilibrium or supra-equilibrium conversion of STC to TCS is the flow rate of the feedstock into the converter. For any particular converter configuration and feedstock composition, it is straight-forward to select an operating pressure and temperature, the temperature being within the range of 300-800° C., and then vary the volumetric flow rate (also referred to as feed rate) while measuring the % STC conversion. In this way, the regions A through E for a particular converter and feedstock and operating temperature and pressure can be determined and employed in the process of the present disclosure.

Post-Reaction Process

The process of the invention will produce products, which may be in gaseous form and referred to as exit gases. Those exit gases will include various molecular, and possibly atomic species. Included within the exit gases will be TCS. TCS is desirably produced because it can be used in the Siemens Process for producing silicon useful for the manufacture of semiconductors and photovoltaic cells. In addition, those exit gases will typically include HCl.

Figure 1:
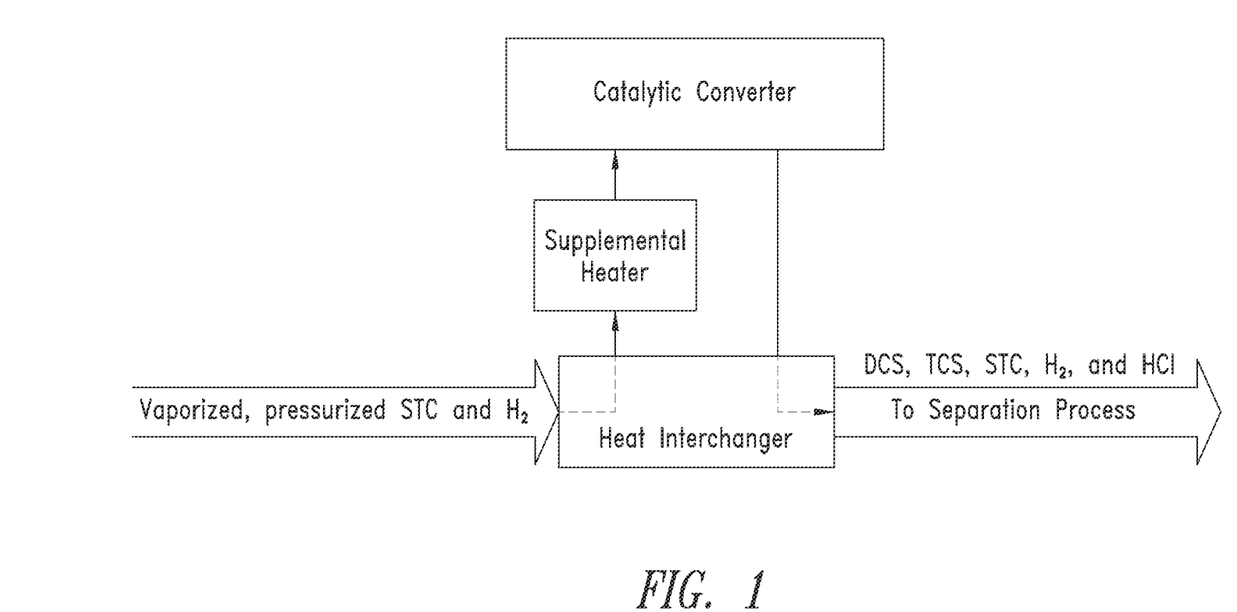

According to one embodiment, upon exiting the catalytic converter, the exit gases are cooled. In one embodiment, the heat of the exit gases is transferred to the feed gases, for example, by way of a heat interchanger as described elsewhere herein. This embodiment is illustrated in FIG. 1 and discussed in further detail later herein.

According to another embodiment, upon exiting the catalytic converter, the exit gases are separated into component parts. The component parts will include TCS, and will typically include both HCl and unreacted STC.

In a preferred embodiment, the TCS produced as described herein is utilized in a process to prepare polysilicon, for example, it is used in the Siemens process. In another preferred embodiment, the unreacted STC collected from the exit gases is recycled back into the catalytic converter of the present invention, as a component of the feed gases described herein. Provided with enough passes through the catalytic converter, all of the STC contained within an aliquot of exit gases can be converted to TCS by the process described herein.

In one embodiment of the present disclosure, the exit gases are refined to provide a gas stream enriched in DCS. This DCS enriched gas stream may be directed to a commutation reactor), i.e., a reactor wherein commutation of DCS and STC to form TCS is accomplished. In one embodiment, the commutation is accomplished by contacting the DCS enriched gas stream with STC, to thereby form two molecules of TCS for each molecule of DCS and STC that enters the commutation reactor. In one embodiment, a stoichiometric excess of STC is contacted with the DCS enriched gas stream, in other words, each mole of DCS from the enriched gas stream is contacted with more than one mole of STC. In this way, the DCS in the enriched gas stream is more efficiently converted by STC to TCS. The gas stream that exits the commutation converter will contain TCS, typically in combination with STC, and also typically in combination with some, but preferably not too much, DCS.

Converter Systems

The Converter

The converter utilized in the present invention will contain one or more inlet sources to allow entry of feed gases into the converter. The converter will also contain one, possibly more than one, outlets to allow the exit of reaction gases from the converter. The converter is configured to allow feedstock to continuously flow into the converter and contact a catalyst, thereby producing a product gas mixture that is continuously removed from the converter. In addition, the converter will include a heating mechanism whereby the contents of the converter are maintained within a selected and elevated temperature range, where that range is typically within the range of 100° C. to 700° C. In addition, the converter will contain catalyst, where the design of the converter may influence the positioning of the catalyst in the converter. In one embodiment, the catalyst occupies the converter in the form of a bed of metal particles or metal wire/mesh. In one embodiment, the converter is a tube or pipe converter, which contains a bed of catalyst. The converter may comprise a multiplicity of tubes, each containing metal catalyst. The converter may comprise a cylinder to which has been added packing or metal wool that is, or supports, metal catalyst. The converter will be made of a sturdy material, for example stainless steel, which can withstand the elevated temperature and pressure that will exist within the converter during operation.

Catalyst

The catalyst used in the present invention is preferably a metal catalyst. In one embodiment the catalyst is a metal silicide. The metal silicide desirably exhibits one or more of the following properties: (a) it forms a stable silicide form, which will form an adduct with a silicon dichloride free radical; (b) it forms a silicide that exhibits multiple valence states (e.g., $Ni_2Si$ or NiSi); and (c) the corresponding metal chloride form of the metal silicide has sufficiently low volatility that it does not vaporize away from the silicide form under reaction conditions (as would $AlCl_3$), or form a non-reactive liquid film (as would $PbCl_2$)). Exemplary metal silicide catalysts are chrome silicide, for example CrSi, $CrSi_2$, $Cr_3Si$ or $Cr_5Si_3$; nickel silicide, for example NiSi, $Ni_2Si$, $NiSi_2$ and $Ni_3Si$; iron silicide, for example, FeSi and $\beta$-$FeSi_2$; and copper silicide. Other metal silicide catalysts may be used as well. In one embodiment, the catalyst is a mixture of metal silicides, for example, chrome silicide in combination with nickel silicide.

The metal catalyst is preferably present within the converter at high surface area. One way to achieve a high surface area of metal catalyst is to provide the catalyst on a structural support. Thus, in one embodiment, the metal silicide is obtained as a powder and this powder is adhered to a support, where the supported metal catalyst is then added to the converter. This is an example of ex situ formation of supported metal catalyst. Another approach is to place high surface area metal (that is, metal having a high area per unit volume, as found e.g., in metal wool) and place this in the converter. The exposure of this high surface metal to one or more of STC, TSC and DSC will convert at least some of the surface of the metal, and if the thickness of the metal is sufficiently small, then the entirety of the metal support, into metal silicide. Thus, in one aspect, the metal silicide catalyst is in the form of wool or wire, which has been formed in situ and is of sufficient structural integrity that the support maintains its morphology under the operating conditions of the converter. Under yet another approach, the catalyst is formed on dumped packing, also known as structured packing, and the silicide forms a layer on the surface of the packing, with unconverted metal existing underneath the metal catalyst. Examples of dumped packing include 316 stainless steel, Pall™ rings, and metal sponge which is a type of porous metal. In general, the catalyst can be formed in situ or ex situ. In a preferred embodiment, the catalyst is formed in situ. When formed in situ, the catalyst will typically have sufficient mechanical stability to maintain its morphology even under the pressure created by the flow of the gasses through the converter. Thus, the shape of the catalyst may be selected to provide for higher efficiency of catalysis. For example, the catalyst may be provided in the form of shaped metal pieces with a high aggregate surface area, or it may take the form of fine wire mesh, as two examples.

Temperature Control

An elevated temperature is maintained with the converter. In various embodiments, the process temperature ranges from about 100° C. to 700° C., or about 300° C. to 600° C., or about 450° C. to 550° C., or about 500° C. The temperature is preferably less than 700° C. The temperature is preferably maintained within a range of ±50° C., or within a temperature range of ±40° C., or within a temperature range of ±30° C., or within a temperature range of ±20° C., or within a temperature range of ±10° C. In order to maintain an elevated temperature within the converter, the converter system will include a means to heat the converter. Many such means are known in the engineering arts, e.g., natural gas heating, and are suitably utilized in the present converter system.

The process being run within the converter is an endothermic reaction. Accordingly, assuming the converter is provided with no heating along its length, then during the process the entrance to the converter will be at higher temperature than the exit from the converter. Optionally, additional heating may be provided along the length of the converter in order to maintain an approximately constant temperature along the converter. Any of the various means known in the art for creating and maintaining elevated temperature within a catalytic converter may be employed in the present invention.

In one embodiment of the invention, the heating means for the converter does not include carbon electrodes coming into the contact with the gases. Carbon electrodes are commonly used in a thermal (i.e., non-catalyzed) process for converting STC to TCS, with the concomitant disadvantage that carbon from the carbon electrodes becomes incorporated into the gases, in the form of, for example, methylchlorosilane compounds. These carbon containing compounds form part of the exit gases, and are very hard to separate from the desired TCS, with the result that the TCS becomes contaminated with carbon compounds. Carbon contaminated TCS is not desirably employed in most processes that utilize TCS, e.g., the Siemens process, for the obvious reason that the carbon may and frequently does contaminate the desired end product, which is polysilicon in the case of the Siemens process. Despite this disadvantage, carbon electrodes are nevertheless often employed in thermal reactions to convert STC to TCS, for the reason that the very high temperatures typically employed in the thermal converter process, i.e., temperatures in excess of 1,000° C., are difficult to create and maintain in an economical manner by any other means. The present invention, which operates at low temperature, is readily able to avoid the need of using carbon electrodes as a heat source in the catalytic converter.

The gases are desirably maintained within a controlled temperature range while they are present within the catalytic converter. In order to achieve that controlled temperature range, the present invention provides an optional embodiment wherein the feed gases are heated to selected temperature(s) prior to the feed gases being directed into the catalytic converter. In one embodiment, the selected temperature of the feed gases is preferably approximately equal to the temperature desirably maintained within the catalytic converter. For instance, the feed gases temperature may be within 50° C., or within 25° C. or within 10° C. of the average temperature of the gas within the catalytic converter. In another embodiment, the selected temperature of the feed gases is approximately equal to the temperature of the gases upon exiting the converter, i.e., the exit temperature of the catalytic converter. Thus, in various embodiments, the invention provides that the feed gases are heated to within 50° C., or within 25° C. or within 10° C. of the exit temperature of the gases, while in a related embodiment, the feed gases are heated to a temperature a few degrees above the exit temperature, for example, to a temperature within the range of the exit temperature to 5° C. above the exit temperature, or within the range of the exit temperature to 10° C. above the exit temperature, or within the range of the exit temperature to 25° C. or within the range of the exit temperature to 50° C. above the exit temperature.

In the case where the feed gases exists in more than one gas stream, then the pre-heating discussed herein is applicable to any one, or preferably each, of the gas streams that comprise the feed gas.

The present invention provides an embodiment where pre-heating of the feed gases is achieved in a two step manner. In a first step, the feed gases are heated to a first temperature that is near but somewhat less than the selected temperature of the feed gases. In a preferred embodiment, the heating of the first step is achieved by way of a heat interchanger. The heat interchanger operates by transferring the heat from a hot gas stream to a cool gas stream. In the present invention, the cool gas stream is the feed gases. In a preferred embodiment, the hot gas stream is the exit gases from the catalytic converter. In a second step, the feed gases at the first temperature are heated in a supplemental heater, until they reach the selected temperature of the feed gases, which may be referred to as the second temperature. The heating that is achieved during the first and second steps of the pre-heating process may be accomplished by any means known in the art for heating gases. However, in various embodiments, the heating process of the second step, i.e., the supplemental heating process, is achieved by means including one or more of direct fired gases and electrical heaters.

Pressure Control

The gases present within the catalytic converter will, of course, exert a pressure on the walls of the converter. That pressure may be controlled by use of a back-pressure control value which is a standard item in the chemical process industry. The back-pressure control value can be set to a desired maximum value, and unless that maximum value is reached, the back-pressure control value does not exert any influence on the reactor parameters. However, if that maximum value is attained, then the back-pressure control valve will automatically open and allow a reduction in pressure. In various embodiments, the process of the present disclosure provides that this maximum pressure is within the range of from 0.5 atm. absolute to 20 atm. absolute, or from 1.0 atm. absolute to 12 atm. absolute, or from 3.0 to 9.0 atm. absolute, or is about 6 atm. absolute.

Flow Rate and Hold-Up Time Control

Starting materials will enter the converter as a feed gas, and products will exit the converter as a product gas. The time between when a starting material enters the converter as a feed gas, and when that starting material exits the converter in the form of a product gas, is referred to herein as the hold-up time. The holdup time of the process may be controlled in order to determine the length of time a reactant is present within the converter while it is being converted to a product. In various embodiments, the holdup time ranges from 0.1 seconds to 20 seconds, or from 1 second to 10 seconds, or from 2 seconds to 5 seconds, or is about 3 seconds.

The holdup time is readily controlled by adjusting the flow rate, conveniently measured as volumetric flow rate, into the converter. The flow rate may be adjusted by several means. For example, the pressure of the feedstock may be increased, by methods well known in the chemical processing art. As the pressure of the feedstock increases, the flow rate of the feedstock into the converter will increase. As another example, the opening of the valve between the feedstock and the converter may be made larger or smaller. Increasing the size of the opening will increase the flow rate of feedstock into the converter.

By careful control of the hold-up time and the temperature within the converter, and for a particular catalyst loading which will impact the converter free volume, the conversion of STC to TCS is achieved according to the present invention under non-thermal-equilibrium conditions, preferably under supra-equilibrium conditions, so that the conversion of STC to TCS is increased relative to that obtained when the conversion is under thermal equilibrium.

Monitoring Embodiment

The process of the present disclosure operates a converter under supra-equilibrium conditions in order to obtain a greater conversion of STC to TCS than can be obtained when the conversion reaction is operated at thermal equilibrium. In one embodiment, the systems disclosed herein include a monitoring means to determine the conversion of STC to TCS. For example, the systems may include a sampling mechanism to obtain a sample of the feedstock and then a detection means that may be used to determine the concentration of one or more components of that feedstock, e.g., the concentration of hydrogen and/or STC in the feedstock. In addition, the systems may include a sampling mechanism to obtain a sample of the product exiting the converter and then a detection means that may be used to determine the concentration of one or more components of that product, e.g., the concentration of the TCS and/or HCl. In this way, data may be obtained which can be used to determine the conversion of STC to TCS.

The process of the present disclosure preferably operates under supra-equilibrium conditions. In other words, the process is run under operating conditions that provide for a greater conversion of STC to TCS than is obtained when the process is run at the same temperature under thermal equilibrium. Two important parameters that may be adjusted in order to create supra-equilibrium conversion of STC to TCS within the converter are the temperature within the converter and the holdup time of the gases within the converter. Generally, as the holdup time increases, the conversion of STC to TCS moves toward an equilibrium value. The converter systems of the present disclosure may include a monitoring mechanism in order to measure the amounts of STC and TCS entering and leaving the reactor, respectively, and then a means to calculate the conversion of STC to TCS as the process is operating based on those measurements, so that adjustments can be made in holdup time, and perhaps temperature, so as to achieve supra-equilibrium operating conditions. The conversion observed can be compared to a calculated thermal equilibrium conversion for the operating temperature of the converter (which may be measured at the same time that STC and TCS concentrations are being determined), to determine whether the process is operating under supra-equilibrium conditions.

Feedback Loop Embodiment

The monitoring embodiment described above may be used in conjunction with a feedback loop embodiment. The feedback loop embodiment receives an STC to TCS conversion value and based on pre-programmed instructions, will automatically adjust operating parameters to achieve a desired STC to TCS conversion value that is a supra-equilibrium value.

Figure 4:
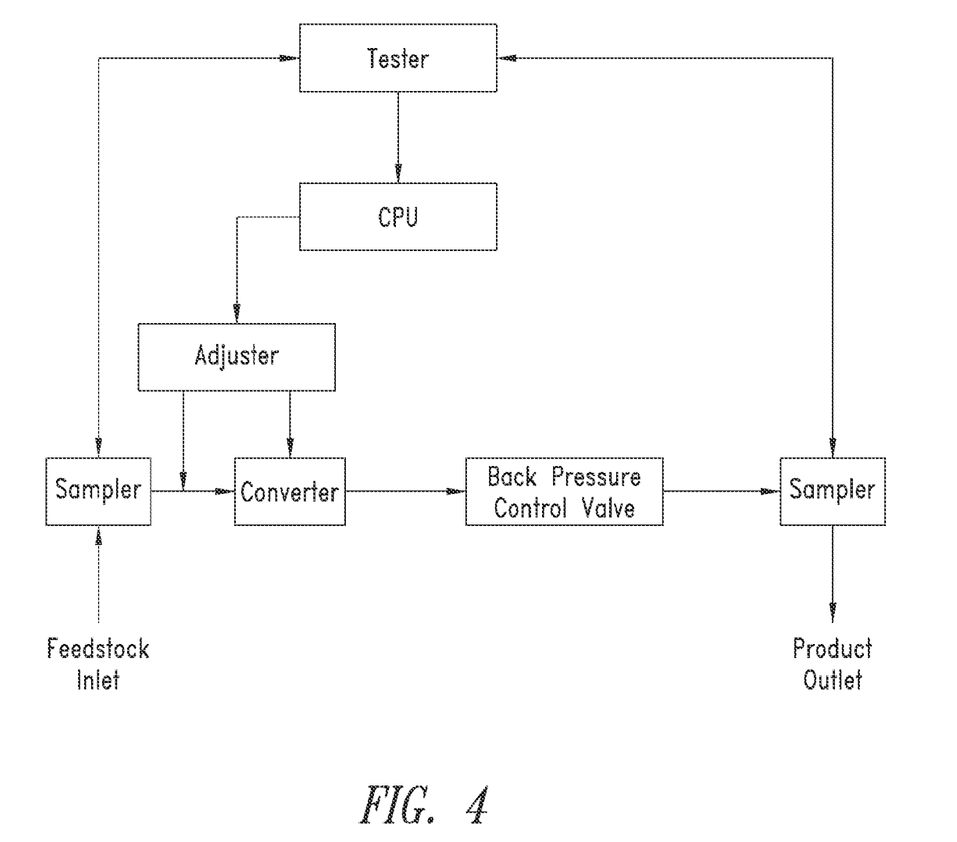
FIG. 4 illustrates an embodiment of a system of the present disclosure which includes an automatic feedback loop in conjunction with a converter.

An exemplary feedback loop embodiment of the present disclosure is illustrated in FIG. 4. In FIG. 4, a converter receives a feedstock and produces a product gas. The conduits that carry the feedstock and the product gases each contain a sampler. The sampler takes aliquots of the feedstock and product gases out of the main stream of the gases. Conduits take those aliquots from the samplers to a testing unit, which will measure the amount of one or more of the components present in the feedstock or product gas. The testing unit may be, for example, a gas chromatogram which has been pre-calibrated to measure the desired components. The information obtained by the testing unit is delivered to a computer (central processing unit, CPU), where calculations are performed to allow a determination of the % STC conversion that is being achieved within the converter. If the % STC conversion is not within the desired range, then the CPU is pre-programmed to send out instructions to an adjuster unit. Upon receiving input from the CPU, the adjuster unit will adjust pre-selected operating parameters of the conversion process, so as to bring the conversion to within the specification for the process. For example, the adjuster unit may be a valve that regulates the amount of $H_2$-containing feed and STC-containing feed that are mixed together to form the feedstock to the converter. As another example, the adjuster unit may be a value that increases or decreases the flow rate of the feedstock into the converter. As a third example, the adjuster unit may a valve that increases or decreases the amount of natural gas that is used to feed a flame that generates the heat that controls the temperature within the converter.

In one embodiment of the system of the present disclosure, the converter is connected to a feedback loop, where the feedback loop determines the STC conversion occurring within the converter, compares that actual conversion to a specification range for acceptable STC conversion, and if the actual measured STC conversion is not within the specification range, sends out instructions to affect adjustment of one or more operating parameters so as to bring the actual STC conversion into the specification range, where, for example, one or more of feedstock flow rate into the converter, converter temperature, converter pressure, and feedstock composition may be altered in view as part of the feedback loop.

Dual-Converter Embodiment

According to another embodiment, two or more converters are positioned in series. According to this embodiment, the product gas from a first converter is heated to a higher temperature before it is fed into a second converter. Optionally, the product gas from the second converter is heated to a higher temperature before it is fed into a third converter, and so on. In this way, the endotherm that occurs over the length of the converter can be offset by repetitive heating systems interspersed between the each sequential converter.

Thus, in one embodiment the present disclosure provides a system, where the system comprises two or more converters in series and in fluid communication with one another, where a gas conduit connects an upstream converter to a downstream converter, and a heating means is in communication with a conduit so as to heat the gas within the conduit, where the converter is a catalytic converter as described herein that converts STC to TCS in a non-equilibrium manner.

Theory

Without intending to be bound thereby, the following theory is provided regarding the chemical reactions occurring within the catalytic converter following the process of the present invention.

The first step is the reaction of STC with $H_2$ at about 500° C. to form the free radical $.SiCl_2$, along with the molecule HCl, as shown in equation 1. The reaction of equation 1 is endothermic by a large amount, and has a high activation energy, to the degree that it is the slow and rate controlling step of the non-catalyzed process. The formation of $.SiCl_2$ is favored by higher $H_2$:STC ratio, and so in a preferred embodiment the reaction is operated under conditions of an excess of $H_2$.

$$SiCl_4 + H_2 \leftrightarrow .SiCl_2 + 2HCl \qquad \text{<Equation 1>}$$

After formation of silicon dichloride radical and HCl, some of the HCl will condense with the silicon dichloride radical to form TCS, as illustrated in equation 2. This reaction is fast and exothermic.

$$.SiCl_2 + HCl \leftrightarrow HSiCl_3 \qquad \text{<Equation 2>}$$

The combination of the reactions illustrated by equations 1 and 2, i.e., the net results of the chemistries shown in equations 1 and 2, is shown in equation 1+2 below, which is the catalytic equivalent of a thermal converter.

$$SiCl_4 + H_2 \leftrightarrow HSiCl_3 + HCl \qquad \text{<Equation 1+2>}$$

A small amount of the large excess of $H_2$ present in the catalytic converter will condense with the silicon dichloride radical formed in equation 1, to make DCS as shown in equation 3.

$$SiCl_2 + H_2 \leftrightarrow H_2SiCl_2 \qquad \text{<Equation 3>}$$

When equation 1 is relatively slow, the TCS formed in equation 2 will react with HCl to form STC, which is what happens in a thermal converter. This chemistry is illustrated in equation 4. The rate of this step is significantly slower than that of equation 2.

$$HSiCl_3 + HCl \leftrightarrow SiCl_4 + H_2 \qquad \text{<Equation 4>}$$

In a thermal converter there is no catalyst, and so the slow reaction of equation 1 results in thermal equilibrium of equations 1, 2, 3 and 4. Under conditions of thermal equilibrium, very little TCS is produced when a thermal converter is operated at 500° C. (see, e.g., FIG. 2), and so thermal converters are typically operated at very high temperatures, that is, temperatures in excess of 1,000° C., in order to encourage formation of the desired TCS. Even under such conditions, a thermal converter typically achieves conversion of STC to TCS of only about 20% per pass through the thermal converter.

The present invention makes use of the realization that by catalyzing the reaction in equation 1, the reaction of equation 1 occurs very much faster than the reaction of equation 4. Furthermore, by keeping the temperature and hold up time relatively low, which may be accomplished under catalytic conditions but not effectively under thermal conditions, the chemistry of equation 4 is discouraged relative to its occurrence under thermal conditions. Low temperature operation is not practical under thermal conditions because under thermal conditions—i.e., without catalyst—the reaction rate of equations 1 and 2 is extremely slow relative to equation 4. The presence of the catalyst allows the reactants and intermediates, comprising equations 1 and 2, to undergo rapid reaction at low temperature where thermal equilibrium is not present. Under the low temperature conditions that may be effectively used in the process of the present invention, TCS is produced faster than it is reacted to STC and TCS may be produced with high conversion at low temperature, e.g., greater than the 20% conversion typically seen in a thermal converter operating at 1,000° C. or higher. Low temperature operation is advantageous for reasons described herein. The converter of the present invention is thus intentionally and favorably controlled in a non-equilibrium mode of operation.

TCS may be formed from STC in a converter containing metal silicide catalyst, where the metal used comprise, for example, nickel, iron, and chrome in pure or alloyed form. At least two reactions are important in the conversion chemistry. One of those two reactions is the formation of silicon-enriched silicide from STC and metal-enriched silicide, which is a relatively fast reaction. The reaction proceeds according to the following chemistry shown in steps a, b and c, where $Ni_2Si$ is used as an exemplary metal-enriched silicide, with the understanding that alternative silicides of nickel, and indeed other silicides that may or may not contain or include nickel, could be substituted for the $Ni_2Si$:

a. $Ni_2Si + SiCl_4 \rightarrow [(Ni_2Si)SiCl_2]Cl_2$
b. $[(Ni_2Si)SiCl_2]Cl_2 + H_2 \rightarrow (Ni_2Si)SiCl_2 + 2HCl$
c. $(Ni_2Si)SiCl_2 + H_2 \rightarrow 2NiSi + 2HCl$ This pathway includes the formation of $.SiCl_2$.

The reverse reaction, i.e., the decomposition reaction of silicon-enriched silicide with HCl to form metal-enriched silicide and TCS is relatively slow, and proceeds according to the following chemistry shown in steps d and e:

d. $2NiSi+2HCl \rightarrow (Ni_2Si)SiCl_2+H_2$ e. $(Ni_2Si)SiCl_2+HCl \rightarrow Ni_2Si+SiHCl_3$ The reaction of STC to form $(Ni_2Si)SiCl_2$ is fast when catalyzed, but the decomposition of the $(Ni_2Si)SiCl_2$ so formed to TCS is relatively slow and is dependent on the presence of HCl in the metal phase containing the silicides in an amount greater than or equal to the stoichiometric amount required for reactions d. and e. In other words, the decomposition reaction requires 3 molecules of HCl to proceed, while the reaction producing silicide from STC produces 4 molecules of HCl. According to current commercial practice and theory (see, e.g., Roewer et al. in DE 4 041 644, DE 4 108 614, U.S. Pat. No. 5,716,590 and US Publication 2009/0035205), these 4 molecules of HCl that are produced by the STC conversion process are removed from the silicide phase into a reaction gas phase containing primarily $H_2$ and STC (which are the reactants introduced into the STC converter) and relatively low amounts of HCl. According to current practice, HCl in the feed to the converter is intentionally minimized to the point of complete removal in an effort to maximize equilibrium conversion of STC to TCS. However, the present disclosure observes that including HCl in the feed to the STC converter can unexpectedly and substantially increase STC conversion resulting in supra-equilibrium amounts of TCS in the converter product stream by initiating and promoting reactions d. and e. In order to manifest this effect, it is desired to operate the STC Converter in a catalytic mode, with a limited hold-up time in the STC converter, as explained next. To operate in a non-equilibrium mode, the converter is operated at a low temperature and a low hold-up time, so that the species within the converter do not reach equilibrium concentration, and preferably reach supra-equilibrium levels of TCS concentration.

Advantages

An advantage of the catalytic STC converter of the present disclosure is that when run in a supra-equilibrium non-equilibrium mode, relatively high conversion of STC to TCS can be achieved. For example, it is possible to achieve a conversion at a low temperature in a non-equilibrium, catalytic converter that is as great as or even larger than the conversion which can be achieved in an equilibrium converter run at high temperature. Regarding equilibrium converters—i.e., the standard converter, because the reaction is endothermic, this means that the temperature must be raised to 1,100° C. to 1,300° C. to achieve an equilibrium conversion in the range of 20%. In comparison, this level of conversion may be achieved at lower temperature—e.g., 500° C. to 700° C.—in a properly designed and run non-equilibrium, catalytic converter of the present disclosure.

At the present time, many industrial plants are operating a thermal converter in order to generate TCS from STC. In those plants, STC and $H_2$ are fed into a converter maintained in excess of 1,000° C., often in the temperature range of 1100-1300° C., in order to achieve a level of STC conversion at thermal equilibrium sufficiently high as to be economically viable. The present invention avoids the need to run at these high temperatures by utilizing a catalytic process which operates at low temperature to convert STC to TCS. The present invention thereby affords multiple advantages.

The catalytic process of the present invention is run at converter temperatures of less than 1,000° C., or less than 800° C., or less than 600° C., and typically around 500° C. This temperature can be created and maintained by conventional methods known in the art, excluding the need to use electrically powered carbon electrodes, also known as graphite electrodes. Carbon electrodes are disadvantageous as a heat source for multiple reasons, including because they are expensive to purchase and operate, and they introduce carbon into the gases that they contact. As the process of the invention does not require temperatures in excess of 1,000° C., it can make use of any of the more conventional heating options which are known and readily available in the art, and which do not incur the high costs associated with operating and maintaining converters at temperatures in excess of 1,000° C.

Relatively lower temperature has other beneficial impacts on the plant design and maintenance needed to operate an effective conversion process. For example, the complex process electrical equipment that is needed to operate carbon electrodes becomes an unnecessary option in the practice of the present invention. Operating without complex process electrical equipment not only obviates the need to buy this expensive equipment, it also obviates the need to maintain this equipment. The avoidance of complex process electrical equipment simplifies a plant design, and allows lower cost options for needed equipment such as converters, providing for less capital cost in the construction of a plan utilizing the inventive process. Thus, not only are energy costs reduced by practice of the present invention, but the relatively low temperatures utilized in the present invention are relatively less damaging to equipment.

The catalytic process of the present invention does not operate at thermal equilibrium, and thus advantageously does not rely upon thermal equilibrium to form the desired TCS. A thermal converter, which operates at high temperature in the absence of catalyst, typically runs at thermal equilibrium and provides roughly 15-20% conversion of STC to TCS per pass through the converter. This incomplete conversion necessitates expensive downstream separation equipment in order to separate TCS and HCl from unconverted STC.

Instead, the process of the invention utilizes a catalyst to rapidly form TCS from STC, and then quickly removes the TCS from the converter before it can undergo any undesirable side reactions, including subsequent reaction with HCl in the converter off-gas to form STC. In one embodiment, the converter is intentionally and favorably run in a non-equilibrium mode of operation, in order, in part, to achieve this result. Thus, the catalytic process of the present invention makes equal or greater amounts of TCS per pass of feed gas through the converter compared to thermal converter processes, or compared to catalyzed converter processes operating under thermal equilibrium conditions.

When a heat interchanger is integrated into the design of the inventive process, then the cost of heating the gas feed is greatly reduced, allowing the process to be run in an extremely lost cost operating mode.

The process of the present disclosure reduces and can optionally eliminate the "back conversion" problem that needs to be addressed with the operation of conventional thermal converters. In conventional thermal converters, which are run in an equilibrium mode, the converter needs to be operated at a very high temperature (in excess of 1,000° C.) in order to push the equilibrium as far as possible toward the formation of TCS from STC. At lower temperatures, e.g., below 1,000° C., the non-catalyzed conversion of STC to TCS is not only much slower than at higher temperatures, but the equilibrium for this endothermic reaction is pushed away from TCS formation and towards STC formation. In other words, as the temperature of a mixture of STC and TCS (and $H_2$ and HCl) is lowered, the equilibrium favors the formation of STC. When this temperature is below about 400° C., while the equilibrium still favors the formation of STC, the kinetics of the conversion between STC and TCS are very slow, and therefore a gas mixture having a supra-equilibrium concentration of TCS (in combination with HCl, $H_2$ and STC) will retain a supra-equilibrium concentration of TCS because the conversion of TCS to STC is very slow. If the product gas mixture from a thermal converter is gradually cooled from, e.g., 1300° C. to 1200° C. and then to 1000° C., the kinetics of conversion between TCS and STC are quick within this temperature range, and at lower temperature the formation of STC is favored. Accordingly, as this gas mixture is cooled from about 1300° C. to about 1000° C., some of the TCS that was formed in the converter will transform back to STC. This, of course, is contrary to the goal of the conversion. In order to address this problem, commercial plants seek to cool the product mixture very quickly, so that the kinetics of the back reaction to form STC is slowed down to a negligible extent. This quenching process to stop back conversion adds cost and complexity to the thermal conversion process. The catalytic conversion of the present disclosure, which operates at lower temperatures than does a non-catalytic conversion, for example operating at temperatures below 1,000° C. and preferably below 800° C., provides a product gas that is likewise at temperatures below 1,000° C. and typically below 800° C., so that back conversion of the product gas mixture prepared by the process of the present disclosure is not a significant problem. While the product gas mixture prepared by the process of the present disclosure can be quenched in temperature to further reduce the possibility of back conversion, because the starting temperature is relatively lower (than that observed with the thermal conversion process) there is less quenching that is necessary to bring the temperature of the product gas to a temperature where the kinetics of back conversion are so slow that back conversion is not a practical concern.

Exemplary Embodiments

FIG. 1 illustrates a preferred process of the present invention in a flow diagram form. STC and $H_2$, in vapor form, enter a heat interchanger and are heated to within a few degrees centigrade of the exit temperature of the catalytic converter. These pre-heated gases are then heated to a few degrees above the exit temperature of the catalytic converter in a supplemental heater. The supplemental heater may be heated by means such as direct fired gases and electrical heaters. The hot gases exiting the supplemental heater are next fed to the catalytic converter where the reaction to gaseous products comprising TCS and HCl occurs. Because the reaction is endothermic, there will be a slight temperature reduction across the catalytic converter. The converter is filled with a metal catalyst. This metal catalyst comprises metal silicide, including without limitation chrome silicide, nickel silicide, and iron silicide, as well as mixtures thereof. The hot gases exiting the catalytic converter are used to preheat incoming STC and $H_2$ vapor in the heat interchanger. Cooled product gases exiting the heat interchanger are then separated into constituent parts (e.g., TCS, HCl, and STC). The refined product gases may be used as feedstock for other processes, e.g., the TCS may be used in polysilicon production, e.g., in the Siemens process. STC may be recycled back to the catalytic converter system until completely converted to TCS.

Thus, the present invention provides, in one embodiment, a process wherein incoming STC is mixed with $H_2$ and heated to within a few degrees (e.g., 50 degrees) centigrade of the exit temperature of the catalytic converter in a heat interchanger; these pre-heated gases are then heated to a few degrees above the exit temperature of the catalytic converter in a supplemental heater (e.g., 50° C.); the supplemental heater may be heated by means comprising direct fired gases, and electrical heaters. The hot gases are next fed to the catalytic converter where the reaction to gaseous products comprising TCS and HCl occurs; the hot gases exiting the catalytic converter are used to preheat incoming STC and $H_2$ vapor in the heat interchanger; cooled product gases exiting the heat interchanger are then separated into constituent parts (e.g., TCS, HCl, and STC) for reuse in the polysilicon plant; and STC separated from the catalytic converter off-gas is recycled back to the catalytic converter system until completely converted to TCS.

In another embodiment, STC conversion is maintained at supra-equilibrium levels by adjusting one or more operation parameters, e.g., converter holdup time. Thus, the present disclosure provides a process for converting STC to TCS, the process including delivering a feedstock comprising STC and $H_2$ into a converter, the converter comprising a catalyst and being operated at a converter temperature within the range of 400 to 800° C., where one or more of the operation parameters of the conversion are selected and adjusted as needed, the operation parameters including converter temperature, converter pressure, converter free volume, and converter holdup time, the operation parameters being selected in order to provide for a supra-equilibrium concentration of TCS in the product. Optionally, adjustments to one or more operation parameters may be made by an automated controller which receives information about the converter and the feedstock and product component concentrations and then decreases or increases a reaction parameter, e.g., the volumetric rate of feedstock entry into the converter, in order to provide for and maintain a supra-equilibrium concentration of TCS in the product gas.

In one aspect of the present disclosure, the converter receives a mixture of STC, $H_2$, and HCl, and is operated in a non-equilibrium mode in the presence of a catalyst, where the non-equilibrium mode comprises operating at low temperature and low hold-up time. In one embodiment, the converter yields TCS at a supra-equilibrium level for a given operating temperature, that is, at a level that exceeds the level of TCS produced when the converter is operated under thermal equilibrium conditions at the same given temperature. Further, the supra-equilibrium level when operated at a relatively low temperature, for example 500° C. to 700° C., may equal or even exceed the level of conversion achieved in a thermal equilibrium converter operated at much higher temperature, e.g., at 1,000° C. to 1,300° C. Due to the back-conversion effect, a standard STC converter gets ~20% conversion only if run at 1,000 to 1,300° C. A catalytic STC converter can get the same or higher conversion, but at lower temperature—about 400° C. to 700° C., or about 400° C. to 800° C., for example.

The present invention provides a process for the manufacture of trichlorosilane, having the following exemplary embodiments: A low temperature process for converting STC to TCS and other products, comprising contacting feed gas comprising STC with a catalyst in a converter, also referred to as a catalytic converter. The catalyst may be a metal catalyst, for example, shaped metal pieces with high aggregate surface area, or a fine wire mesh. The metal catalyst may comprise metal silicides, including without limitation chrome silicide, nickel silicide, and iron silicide. Optionally, the catalyst may be formed in situ, or in other words, the catalyst is formed within the converter. In one embodiment, the converter is charged with self-supporting metal, and at least a portion of the surface of that metal is converted to metal catalyst. In another embodiment, the converter is charged with a fine wire mesh, and the entirety of the mesh is converted to metal catalyst. The process is run at low temperature, e.g., at a temperature of less than 700° C., for example, a temperature of from 100° C. to 700° C., or from 300° C. to 600° C., or from 400° C. to 500° C., or about 500° C. The hold-up time of the feed gas in the converter optionally ranges from 0.1 second to 20 seconds, or from 1 second to 10 seconds, or from 2 seconds to 5 seconds, or is about 3 seconds. The pressure within the converter may range from 0.5 atmospheres absolute to 20 atmospheres absolute, or from 1.0 atmosphere absolute to 12 atmospheres absolute, or is about 6 atmospheres absolute. By selective control of the temperature and hold up time within the converter, the reaction may be run under non-equilibrium conditions, allowing for increased conversion of STC to TCS relative to the conversion obtained in a catalyzed reaction substantially run to equilibrium conversion, or in a non-catalyzed reaction, e.g., a reaction run in a thermal converter in the absence of catalyst at an equivalent temperature, or even at a high temperature, typically in excess of 1,000° C.

In a preferred embodiment, feed gas is formed by diluting STC with $H_2$ and then the feed gas is heated to within a few degrees centigrade of the exit temperature of the catalytic converter in a heat interchanger; these pre-heated feed gases are then heated to a few degrees above the exit temperature of the catalytic converter in a supplemental heater. The supplemental heater may be heated by means comprising direct fired gases, and electrical heaters, as two options. The hot feed gases are next fed to the catalytic converter where the reaction to gaseous products comprising TCS and HCl occurs. The hot gases exiting the catalytic converter may, in one embodiment, be used to preheat incoming STC and $H_2$ vapor in the heat interchanger. Alternatively, the exit gases may be cooled by any conventional means known in the art. The cooled product gases exiting the heat interchanger are then separated into constituent parts (e.g., TCS, HCl, and STC) for reuse in, for example, a polysilicon manufacturing plant. The STC separated from the catalytic converter exit gases may be recycled back to the catalytic converter system until completely converted to TCS.

The operation of a converter in a catalytic non-equilibrium mode entails converting STC to TCS and other products including DCS by contacting feed gas comprising STC, $H_2$ and optionally HCl with a catalyst in a converter, the converter also referred to as a catalytic converter. The catalyst may be a metal catalyst, for example, shaped metal pieces with high aggregate surface area, or a fine wire mesh. The metal catalyst may comprise metal silicides, including without limitation chrome silicide, nickel silicide, and iron silicide. Optionally, the catalyst may be formed in situ, or in other words, the catalyst is formed within the converter. In one embodiment, the converter is charged with self-supporting metal, and at least a portion of the surface of that metal is converted to metal catalyst. In another embodiment, the converter is charged with a fine wire mesh, and the entirety of the mesh is converted to metal catalyst. The process is run at low temperature, e.g., at a temperature of less than 700° C., for example, a temperature of from 100° C. to 700° C., or from 300° C. to 600° C., or from 400° C. to 500° C., or about 500° C. The hold-up time of the feed gas in the converter optionally ranges from 0.1 second to 20 seconds, or from 1 second to 10 seconds, or from 2 seconds to 5 seconds, or is about 3 seconds. The pressure within the converter may range from 0.5 atmospheres absolute to 20 atmospheres absolute, or from 1.0 atmosphere absolute to 12 atmospheres absolute, or is about 6 atmospheres absolute. By selective control of the temperature and hold up time within the converter, the reaction may be run under non-equilibrium conditions, allowing for increased conversion of STC to TCS relative to the conversion obtained in a catalyzed or non-catalyzed reaction run substantially to thermal equilibrium, e.g., a reaction run in a thermal converter in the absence of catalyst at a high temperature, typically in excess of 1,000° C.

The various embodiments described above can be combined to provide further embodiments. All of the U.S. patents, U.S. patent application publications, U.S. patent applications, foreign patents, foreign patent applications and non-patent publications referred to in this are incorporated herein by reference, in their entirety. Aspects of the embodiments can be modified, if necessary to employ concepts of the various patents, applications and publications to provide yet further embodiments. Section titles and headings used herein are provided for convenience only and are not to be construed as limiting on the subject matter disclosed within a section.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A process for converting silicon tetrachloride (STC) to trichlorosilane (TCS), comprising contacting a feed gas comprising STC and $H_2$ with a catalyst in a converter under non-equilibrium operating conditions to provide a supra-equilibrium level of STC conversion to TCS.

2. The process of claim 1, where the catalyst is a metal catalyst.

3. The process of claim 2 where the metal catalyst comprises metal silicides, including without limitation chrome silicide, nickel silicide, and iron silicide.

4. The process of claim 2 wherein the metal catalyst is formed within the converter.

5. The process of claim 4 wherein the converter is charged with a self-supporting metal support, and the surface of the support is at least partially converted to metal catalyst.

6. The process of claim 5 wherein the converter is charged with a metal support, and the entirety of the metal support is converted to metal catalyst, the metal catalyst having sufficient mechanical integrity to maintain its morphology during operation of the converter.

7. The process of claim 6 wherein the process is conducted at a temperature of less than 700° C.

8. The process of claim 6 wherein the process is conducted at a temperature within the range of 400-600° C.

9. The process of claim 6 wherein a hold-up time of the feed gas in the converter ranges from 0.1 second to 30 seconds.

10. The process of claim 9 wherein the hold-up time of the feed gas in the converter is 1-5 seconds.

11. The process of claim 1 wherein the pressure in the converter is in the range of from 0.5 atmospheres absolute to 20 atmospheres absolute.

12. The process of claim 11 where the pressure in the converter is in the range of 2 to 10 atmospheres absolute.

13. The process of claim 1 wherein the feed gas comprises $H_2$ and STC at a $H_2$:STC molar ratio in the range of 1:1 to 5:1.

14. The process of claim 1 wherein the feed gas further comprises HCl.

15. The process claim 1 wherein the supra-equilibrium level of STC conversion to TCS is at least 5% greater than an equilibrium level of STC conversion to TCS under otherwise identical reaction conditions.

16. The process of claim 1 where incoming STC is mixed with $H_2$ and heated to within a few degrees centigrade of the exit temperature of the catalytic converter in a heat interchanger to provide pre-heated gases; these pre-heated gases are then heated to a few degrees above the exit temperature of the catalytic converter in a supplemental heater to provide hot gases; the supplemental heater is heated by means selected from direct fired gases and electrical heaters; the hot gases are fed to the catalytic converter where a reaction to form gaseous products comprising TCS and HCl occurs; the hot gases exiting the catalytic converter are used to preheat incoming STC and $H_2$ vapor in the heat interchanger; cooled product gases exiting the heat interchanger are then separated into constituent parts (e.g., TCS, HCl, and STC) for reuse in a polysilicon plant; and STC separated from the catalytic converter off-gas is recycled back to the catalytic converter system until completely converted to TCS.

\* \* \* \* \*